US010087088B2

(12) United States Patent
James (10) Patent No.: US 10,087,088 B2
(45) Date of Patent: Oct. 2, 2018

(54) WASTE HEAT WATER PURIFIER AND COOLING SYSTEM

(71) Applicant: Microsoft Corporation, Redmond, WA (US)

(72) Inventor: Sean James, Olympia, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 922 days.

(21) Appl. No.: 14/318,576

(22) Filed: Jun. 27, 2014

(65) Prior Publication Data

US 2015/0376031 A1 Dec. 31, 2015

(51) Int. Cl.
*B01D 21/30* (2006.01)
*B01D 35/18* (2006.01)
(Continued)

(52) U.S. Cl.
CPC .............. *C02F 1/16* (2013.01); *C02F 1/02* (2013.01); *F24F 5/0035* (2013.01);
(Continued)

(58) Field of Classification Search
CPC ..... B01D 1/28; B01D 3/14; C02F 1/02; C02F 1/04; C02F 1/16; C02F 1/22;
(Continued)

(56) References Cited

U.S. PATENT DOCUMENTS 6,166,907 A * 12/2000 Chien ................... F28D 1/0478
165/104.33
7,864,530 B1 1/2011 Hamburgen et al.
(Continued)

FOREIGN PATENT DOCUMENTS

WO 2009146504 A1 12/2009

OTHER PUBLICATIONS

Metz, Cade, "Google Flushes Heat From Data Center with Toilet Water", Published on: Mar. 15, 2012 Available at: http://www.wired.com/2012/03/google-sewer-water/.
(Continued)

*Primary Examiner* — Hayden Brewster
(74) *Attorney, Agent, or Firm* — The Watson I.P. Group, PLC; Vladan M. Vasiljevic (57) ABSTRACT

Waste heat generated by devices as a byproduct of their operation is utilized to increase and maintain the temperature of non-potable water to neutralize biological contaminants, thereby rendering such water potable. The potable water can then be utilized for evaporative cooling of the devices. A temperature sensor monitors the temperature of the non-potable water and a controller controls the pump to provide sufficient time for the water to remain in the heat exchanger above a predetermined temperature to neutralize biological contaminants and render such water potable. To the extent that different devices generate different quantities and intensities of waste heat, multiple heat exchangers are utilized, with lower intensity waste heat serving to preheat the water and, thereby, reduce the amount of time needed to reach the target temperature in a primary heat exchanger. Waste heat not utilized to generate potable water can be utilized for other heat-driven processes.

19 Claims, 4 Drawing Sheets

(51) Int. Cl.
- *C02F 1/02* (2006.01)
- *C02F 1/16* (2006.01)
- *F24F 5/00* (2006.01)
- F28D 15/00 (2006.01)
- F28F 7/00 (2006.01)
- G05D 23/00 (2006.01)
- H05K 5/00 (2006.01)
- C02F 101/30 (2006.01)
- C02F 103/02 (2006.01)

(52) U.S. Cl.
CPC ........ *F24F 5/0046* (2013.01); *C02F 2101/30* (2013.01); *C02F 2103/023* (2013.01); *C02F 2209/02* (2013.01); *C02F 2303/04* (2013.01); *F24F 2005/006* (2013.01)

(58) Field of Classification Search
CPC ............ C02F 2101/30; C02F 2103/023; C02F 2209/02; C02F 2303/04; F24F 5/00; F24F 5/0035; F24F 5/0046
USPC .................... 165/279, 282; 202/180; 203/10; 210/149, 181
See application file for complete search history.

(56) References Cited

U.S. PATENT DOCUMENTS

| | | | |
|---|---|---|---|
| 8,223,495 B1* | 7/2012 | Carlson | F24F 5/0035 165/104.33 |
| 8,553,416 B1 | 10/2013 | Carlson et al. | |
| 2004/0038089 A1* | 2/2004 | Hoffjann | B64D 11/02 60/645 |
| 2009/0078401 A1 | 3/2009 | Cichanowicz | |
| 2009/0152183 A1 | 6/2009 | Stewart et al. | |
| 2011/0075353 A1* | 3/2011 | Attlesey | G06F 1/20 361/679.47 |
| 2012/0071082 A1* | 3/2012 | Karamanos | F24F 5/0003 454/284 |
| 2013/0019124 A1 | 1/2013 | Grimshaw | |
| 2013/0025818 A1* | 1/2013 | Lyon | H05K 7/20781 165/11.1 |
| 2013/0301213 A1* | 11/2013 | Senyk | G06F 1/203 361/679.47 |
| 2013/0312435 A1 | 11/2013 | Khalifa | |
| 2013/0333405 A1 | 12/2013 | Belady et al. | |
| 2013/0345893 A1* | 12/2013 | David | G05D 23/00 700/300 |
| 2014/0173299 A1 | 6/2014 | McKnight et al. | |
| 2014/0372772 A1 | 12/2014 | McKnight et al. | |
| 2015/0214771 A1 | 7/2015 | Peterson et al. | |

OTHER PUBLICATIONS

Miller, Rich, "Microsoft to Slash its Water Impact in Quincy", Published on: Oct. 13, 2011 Available at: http://www.datacenterknowledge.com/archives/2011/10/13/microsoft-to-slash-its-water-impact-in-quincy/.

Charter, Scott, "Five Secrets to a More Efficient Data Center", Published on: Feb. 12, 2014 Available at: http://datacenterpost.com/2014/02/five-secrets-efficient-data-center.html.

Carlson, Amy L., "Applying Fuel Cells to Data Centers for Power and Cogeneration", In Report for Requirement for the degree of Master of Science, May 2009, 86 pages.

Fehrenbacher, Katie, "Microsoft Building Clean Powered Data Center at Waste Water Plant", Published on: Nov. 19, 2012 Available at: http://gigaom.com/2012/11/19/microsoft-building-clean-powered-data-center-at-waste-water-plant/.

Riekstin, et al., "No More Electrical Infrastructure: Towards Fuel Cell Powered Data Centers", In Proceedings of Workshop on Power-Aware Computing and Systems, Nov. 3, 2013, 5 pages.

Sverdlik, Yevgeniy, "Commscope Says Forget Generators, buy Hydrogen Fuel Cells Instead", Published on: Feb. 10, 2014 Available at: http://www.datacenterdynamics.com/focus/archive/2014/02/commscope-says-forget-generators-buy-hydrogen-fuel-cells-instead.

"'If It Ain't Broke, Don't Fix it' . . . Right?", Retrieved on: Apr. 7, 2014 Available at: http://datacenterdiscovery.com/blog/?p=139.

"International Search Report & Written Opinion Received for PCT Patent Application No. PCT/US2015/037313", dated Aug. 25, 2015, 9 Pages.

* cited by examiner

WASTE HEAT WATER PURIFIER AND COOLING SYSTEM

BACKGROUND

The throughput of communications, between multiple computing devices that are transmitted via network connections, continues to increase. Modern networking hardware enables physically separate computing devices to communicate with one another orders of magnitude faster than was possible with prior generations of networking hardware. Furthermore, high-speed network communication capabilities are being made available to a greater number of people, both in the locations where people work, and in their homes. As a result, an increasing amount of data and services can be meaningfully provided via such network communications. Additionally, it has become more practical to perform digital data processing at a location remote from the user requesting such processing, or on whose behalf such processing is being performed. Consequently, large quantities of data processing capability are being aggregated into centralized locations that comprise dedicated hardware and support systems. The large quantities of data processing offered by such centralized locations can then be shared across networks.

To provide such large-scale data and processing capabilities, via network communications, from a centralized location, the centralized location typically comprises hundreds or thousands of computing devices, typically mounted in vertically oriented racks. Such a collection of computing devices, as well as the associated hardware necessary to support such computing devices, and the physical structure that houses the computing devices and associated hardware, is traditionally referred to as a "data center". With the increasing availability of high-speed network communication capabilities, and thus the increasing provision of data and services from centralized locations, as well as the traditional utilization of data centers, such as the provision of advanced computing services and massive amounts of computing processing capability, the size and quantity of data centers continues to increase.

However, computing devices consume energy and generate heat when performing processing. The aggregation of large quantities of computing devices in a single data center results in large amounts of power consumption and large quantities of heat being generated that must be removed in order to enable the computing devices to continue to operate optimally and avoid overheating. Traditionally, data center power is provided by electricity sourced from a conventional electrical power grid and delivered to the various computing devices and support hardware through common metal-wire electrical connections. Similarly, traditionally, data center cooling is provided by forced-air mechanisms that deliver cool air into a data center and remove hot air therefrom. The cool air is typically provided by cooling down recirculated air through the use of power-consuming cooling methodologies, such as air-conditioning. The power consumed by the computing devices, support hardware and air conditioning can introduce substantial cost into the operation of a data center. For example, large air conditioning units, such as are typically required by a data center, can consume large quantities of electrical power, often during the most expensive times of the day, resulting in high energy costs. Alternative cooling mechanisms can consume less electrical power, resulting in reduced energy costs, but can introduce other costs or difficulties. For example, evaporative coolers can utilize the evaporation of water to provide cooling capability while consuming less electrical power than traditional air-conditioning units. However, evaporative coolers, especially direct evaporative coolers, can require the utilization of potable water for health and safety reasons, and to comply with relevant codes and ordinances. In some instances, potable water can be more expensive than electrical power.

SUMMARY

Waste heat generated by devices as a byproduct of their operation can be utilized to increase and maintain the temperature of non-potable water at a point at which biological contaminants can be neutralized, thereby rendering such water potable. The potable water can then be utilized for evaporative cooling of the devices. The waste heat of the devices can be transferred to the non-potable water through a heat exchanger that has a thermodynamic connection with the devices, and through which non-potable water can be pumped. A temperature sensor can monitor the temperature of the non-potable water and a controller can control the pump to provide sufficient time for the water to remain in the heat exchanger above a predetermined temperature to neutralize biological contaminants and render such water potable. Non-potable water can comprise contaminants and a filter can be utilized prior to the non-potable water being pumped into the heat exchanger to remove such contaminants. To the extent that different devices generate different quantities and intensities of waste heat, multiple heat exchangers can be utilized, with lower intensity waste heat serving to preheat the water and, thereby, reduce the amount of time needed to reach the target temperature in a primary heat exchanger. Additionally, waste heat not utilized to generate potable water can be utilized for other heat-driven processes. A storage container can accommodate variations in the quantity of potable water that is generated, in the generation of potable water can be increased during periods of time when power or other raw materials consumed by the devices are less expensive.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to utilization of waste heat to generate potable water, including potable water for evaporative cooling of the devices generating the waste heat. The waste heat generated by devices as a byproduct of their operation can be utilized to increase and maintain the temperature of non-potable water at a point at which biological contaminants, namely pathogens in the non-potable water, can be neutralized, thereby rendering such water potable. The potable water can then be utilized for evaporative cooling of the devices under applicable governmental and safety regulations. The waste heat of the devices can be transferred to the non-potable water through a heat exchanger that has a thermodynamic connection with the devices, and through which non-potable water can be pumped. A temperature sensor can monitor the temperature of the non-potable water and a controller can control a pump to provide sufficient time for the water to remain in the heat exchanger above a predetermined temperature so as to neutralize biological contaminants and render such water potable. Non-potable water can comprise contaminants and a filter can be utilized prior to the non-potable water being pumped into the heat exchanger to remove such contaminants. To the extent that different devices generate different quantities and intensities of waste heat, multiple heat exchangers can be utilized, with lower intensity waste heat serving to preheat the water and, thereby, reduce the amount of time needed to reach the target temperature in a primary heat exchanger. Additionally, waste heat not utilized to generate potable water can be utilized for other heat-driven processes. A storage container can accommodate variations in the quantity of potable water that is generated, and the generation of potable water can be increased during periods of time when power or other raw materials consumed by the devices are less expensive.

The techniques described herein make reference to specific environments, such as data center environments where the devices consuming power and generating waste heat are either computing devices, such as the ubiquitous rack-mounted server computing devices, or are electrical energy producing devices, such as fuel cells. Such references, however, are strictly exemplary and are made for ease of description and presentation, and are not intended to limit the mechanisms described to the specific environments and computing devices enumerated. Indeed, the techniques described herein are equally applicable, without modification, to any environment in which heat is generated as a byproduct by devices generating other useful output.

Figure 1:
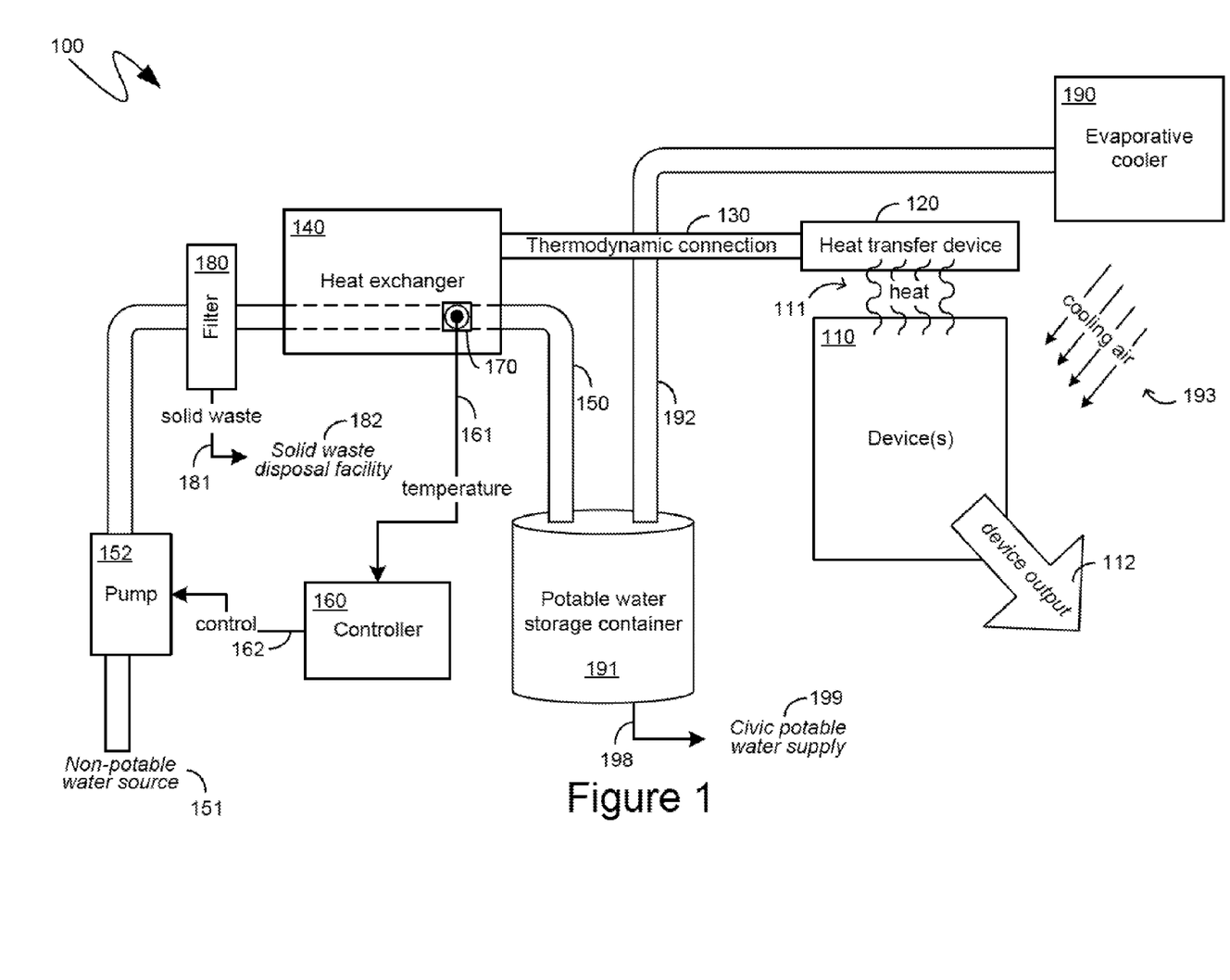
FIG. 1 is a block diagram of an exemplary generation of potable water from waste heat.

With reference to FIG. 1, an exemplary system 100 is shown therein, illustrating mechanisms by which potable water can be generated utilizing the waste heat of devices that are producing other useful output. In particular, the exemplary system 100 of FIG. 1 illustrates one or more devices 110, which can produce other useful output 112 and can generate waste heat 111. As utilized herein, the term "other output" means any output, other than heat, of a device that generates heat as a byproduct of the production of such output. Thus, a device designed specifically for the purpose of generating heat, such as, for example, a heater, does not generate "waste" heat because the heat generated by such a device is not a byproduct of some other output. The devices 110 can comprise one or more computing devices, such as blade server computing devices arranged in one or more racks, such as would be typically found within a data center. In such an instance, the device output 112 could be the data processed by such computing devices. The devices 110, however, are not limited to computing devices and can, according to other aspects, be any device that generates waste heat in performing a useful function and generating a useful, non-heat output, including, for example, manufacturing devices, production devices, construction devices, and other like devices. The devices 110 can also comprise power-producing devices, including electrical-power-producing devices, such as generators, fuel cells, and the like, which can consume raw materials, such as liquid fuel, natural gas, shale gas, biogas or propane, and can generate a form of power, such as electrical power, as the device output 112.

Waste heat generating devices, such as the exemplary devices 110, illustrated in the system 100 of FIG. 1, can require cooling to maintain optimal operation. The exemplary system 100 of FIG. 1 illustrates an evaporative cooler 190, which can provide cooling air 193 to the devices 110. Due to safety, and conformance with governmental and safety regulations, evaporative coolers, especially direct evaporative coolers, can be required to utilize only potable water in their operation. Depending on the environment within which the exemplary system 100 of FIG. 1 is located, potable water can be expensive, and can even be more expensive then electrical power or other raw materials.

The exemplary system 100 of FIG. 1 illustrates one mechanism by which the waste heat 111, being generated by the devices 110, can be utilized to generate potable water, which can then be utilized by the evaporative cooler 190, as well as being utilized for other purposes, including traditional utilizations of potable water. A heat transfer device, such as the exemplary heat transfer device 120, can facilitate the transfer of the waste heat 111 from the devices 110. Such a heat transfer device can be a metal plate, a cold plate, a heatsink, or any other like device that can facilitate the transfer of the waste heat 111 from the devices 110 while such devices generate the device output 112. For example, if the devices 110 were server computing devices, the exemplary heat transfer device 120 can comprise one or more heatsinks directly attached to the processors of such server computing devices, thereby drawing waste heat away from such processors and, thereby aiding their operation. As another example, if the devices 110 were fuel cells, the heat transfer device 120 can comprise a cold plate or other like metallic device affixed to the fuel cell, again drawing waste heat therefrom and, thereby, aiding its operation.

The heat transfer device 120 can comprise a thermodynamic connection 130 to a heat exchanger 140 through which non-potable water can be pumped and, thereby, heated up. More specifically, the thermodynamic connection 130 can be any connection by which waste heat 111, absorbed by the heat transfer device 120, can be conveyed to the heat exchanger 140. For example, the thermodynamic connection 130 can comprise a metal bar or other like metallic member through which heat can be conductively transmitted. As another example, the thermodynamic connection 130 can comprise piping, such as a closed loop of piping, through which a liquid, such as water, can be pumped in order to transmit heat convectively from the heat transfer device 120 to the heat exchanger 140. Other conductive or convective thermodynamic connections, or combinations thereof, are equally applicable to the mechanisms described.

The heat exchanger 140 can comprise piping 150 positioned through it to enable liquids to be pumped through the piping 150 and absorb heat from the heat exchanger 140. More specifically, the heat exchanger 140 can facilitate the transfer of heat from the heat transfer device 120, having the thermodynamic connection 130 with the heat exchanger 140, and a liquid pumped through the piping 150. For example, the heat exchanger 140 can comprise two sets of inter-wound piping where liquid from the heat transfer device 120 passes through one set of piping, and the piping 150 comprises the other set of piping, thereby facilitating heat exchange between the two liquids. As another example, the heat exchanger 140 can comprise the piping 150 cycled back and forth through metal fins or other like convective thermodynamic connection 132 the heat transfer device 120. Other heat exchangers utilizing conductive or convective mechanisms, or combinations thereof, by which to transfer heat are equally applicable to the mechanisms described.

According to one aspect, non-potable water can be pumped through the piping 150, such as via the pump 152, and can thereby be heated up by the transfer of heat from the devices 110, through the heat transfer device 120 to such non-potable water via the heat exchanger 140. The heating of the non-potable water, in the heat exchanger 140, can be sufficient to neutralize biological contaminants, namely pathogens or other like microorganisms present in such non-potable water, thereby making such water potable. For example, water temperatures above seventy degrees Celsius can kill pathogens within thirty minutes. As another example, water temperatures above eighty-five degrees Celsius can kill pathogens within a few minutes. Consequently, commencing at a temperature of approximately seventy degrees Celsius, in the time required for water to reach its boiling point from such a temperature, all pathogens within such water should be killed, even at a high altitude. Additionally, to ensure the neutralization of biological contaminants, namely pathogens, water can be kept boiling for a predetermined duration, such as, for example, for one minute.

By way of comparison to the above-described temperatures, power generation devices such as, for example, fuel cells, can reach internal temperatures of six hundred to one thousand degrees Celsius. Consequently, the waste heat from such devices can be more than sufficient to heat non-potable water to temperatures at which biological contaminants, such as microorganisms, would be killed and otherwise neutralized, and such water would, thereby, become potable water. Other devices such as, for example, server computing devices can reach internal temperatures of approximately sixty degrees Celsius. However, as will be described in further detail below, the waste heat generated by such devices can provide a form of preheating to raise the temperature of the non-potable water such that further heating of the non-potable water to the predetermined temperatures to neutralized biological contaminants and render such water potable can require less energy, thereby increasing the energy efficiency of the overall system.

A temperature sensor, such as the exemplary temperature sensor 170, can monitor the temperature of the non-potable water in the heat exchanger 140 to ensure that such water reaches a predetermined temperature for a predetermined period of time in order to neutralize biological contaminants and render such water potable. The temperature sensor, such as the exemplary temperature sensor 170, can provide temperature data 161 to a controller 160. The controller 160 can issue control commands 162, to the pump 152, to ensure that non-potable water remains in the heat exchanger 140 for a sufficient length of time to render such water potable. For example, the controller 160 can activate the pump 152 to pump an amount of non-potable water into the heat exchanger 140 that is less than or equal to the capacity of the piping 150 within the heat exchanger 140. Subsequently, the controller 160 can monitor the temperature data 161 as the temperature of the non-potable water in the heat exchanger 140 increases as heat is transferred from the devices 110 to the non-potable water via the heat transfer device 120, the thermodynamic connection 130 and the heat exchanger 140.

Once the temperature data 161 indicates that an appropriate temperature has been maintained for an appropriate period of time, the controller 160 can issue control commands 162, to the pump 152, to request the pump 152 to pump additional non-potable water into the heat exchanger 140. For example, the controller 160 can issue control commands 162, to the pump 152, to request the pump 152 to pump additional non-potable water into the heat exchanger 140 once a boiling temperature is reached, so long as the time period during which the temperature of the water has been above eighty-five degrees Celsius has been more than a few minutes. As another example, the controller 160 can issue control commands 162, to the pump 152, to request the pump 152 to pump additional non-potable water into the heat exchanger 140 once a water temperature of at least seventy degrees Celsius has been maintained for more than a half an hour. Irrespective of the exact temperature data 161 triggering the controller 160 to issue the control commands 162, to the pump 152, to request the pump 152 to pump the additional non-potable water into the heat exchanger 140, once such pumping commences, it can cause the water that was in the heat exchanger, and has now become potable water, to exit the heat exchanger 140 and, according to one aspect, be retained in a potable water storage container 191.

A potable water storage container, such as exemplary potable water storage container 191, can reduce variances in the availability of potable water for evaporative cooling, such as that provided by the evaporative cooler 190. Thus, as illustrated by the piping 192, the evaporative cooler 190 can obtain potable water from the potable water storage container 191 and can, thereby, generate the cooling air 193 for the devices 110.

According to one aspect, the devices 110 can operate on a continuous basis such that the waste heat 111 is continuously available to generate potable water, such as in the manner described in detail above. Conversely, the cooling provided by the evaporative cooler 190 can be requested only temporarily. For example, the evaporative cooler 190 may need to provide the cooling air 193 only during daylight or afternoon hours. As another example, the evaporative cooler 190 may need to provide the cooling air 193 only during discrete periods of warm weather, or during a warm season. In such instances, the potable water storage container 191 can enable a supply of potable water to be built up over time, as the above-described processes produce potable water at a continuous rate. Subsequently, during those discrete periods when the evaporative cooler 190 requires potable water for cooling, it can obtain such water via the piping 192 from the potable water storage container 191. Such mechanisms can enable the exemplary system 100 to generate a sufficient quantity of potable water even if the potable water generation mechanisms described generate potable water more slowly than would be utilized by the evaporative cooler 190, when such an evaporative cooler was operational.

Additional uses of the potable water stored in the potable water storage container 191 are equally contemplated. For example, a connection 189 can couple the potable water storage container 191 to a civic potable water supply 199. As another example, the potable water in the potable water storage container 191 can be utilized for the consumption of water by individuals, organisms and resources co-located with the devices 110.

The non-potable water referenced above can be obtained from a non-potable water source 151 that can comprise effluent, storm water, a natural water source, such as a stream or river, or other like non-potable water sources. According to one aspect, a non-potable water source, such as the exemplary non-potable water source 151, can provide non-potable water that comprises impurities, including waste impurities, chemical impurities and other like impurities. In such an aspect, a filter, such as the exemplary filter 180, can be utilized to filter out impurities. For example, as illustrated by the exemplary system 100 of FIG. 1, the filter 180 can filter out solid waste 181 and direct such solid waste a solid waste disposal facility 182, such as a waste treatment facility. In such an example, the filter 180 can be a mechanical filter, such as a screen, a mesh, or other like mechanical filter. In other aspects, the filter 180 can be a chemical filter, or a combination of one or more mechanical or chemical filters arranged serially, or in parallel, in the water flow of the piping 150.

An additional benefit of the above-described mechanisms can be to reduce the quantity of non-potable water that must be processed by municipal water processing facilities, or must otherwise be dealt with. As will be recognized by those skilled in the art, traditional water processing facilities, to which non-potable water, such as from the non-potable water source 151, would typically be directed, are constrained, not by the concentration of pollutants in the non-potable water, but rather by the volume of the non-potable water itself. Consequently, to the extent that the above-described mechanisms can reduce the volume of non-potable water required to be treated by such water processing facilities, an additional benefit can be realized.

Figure 2:
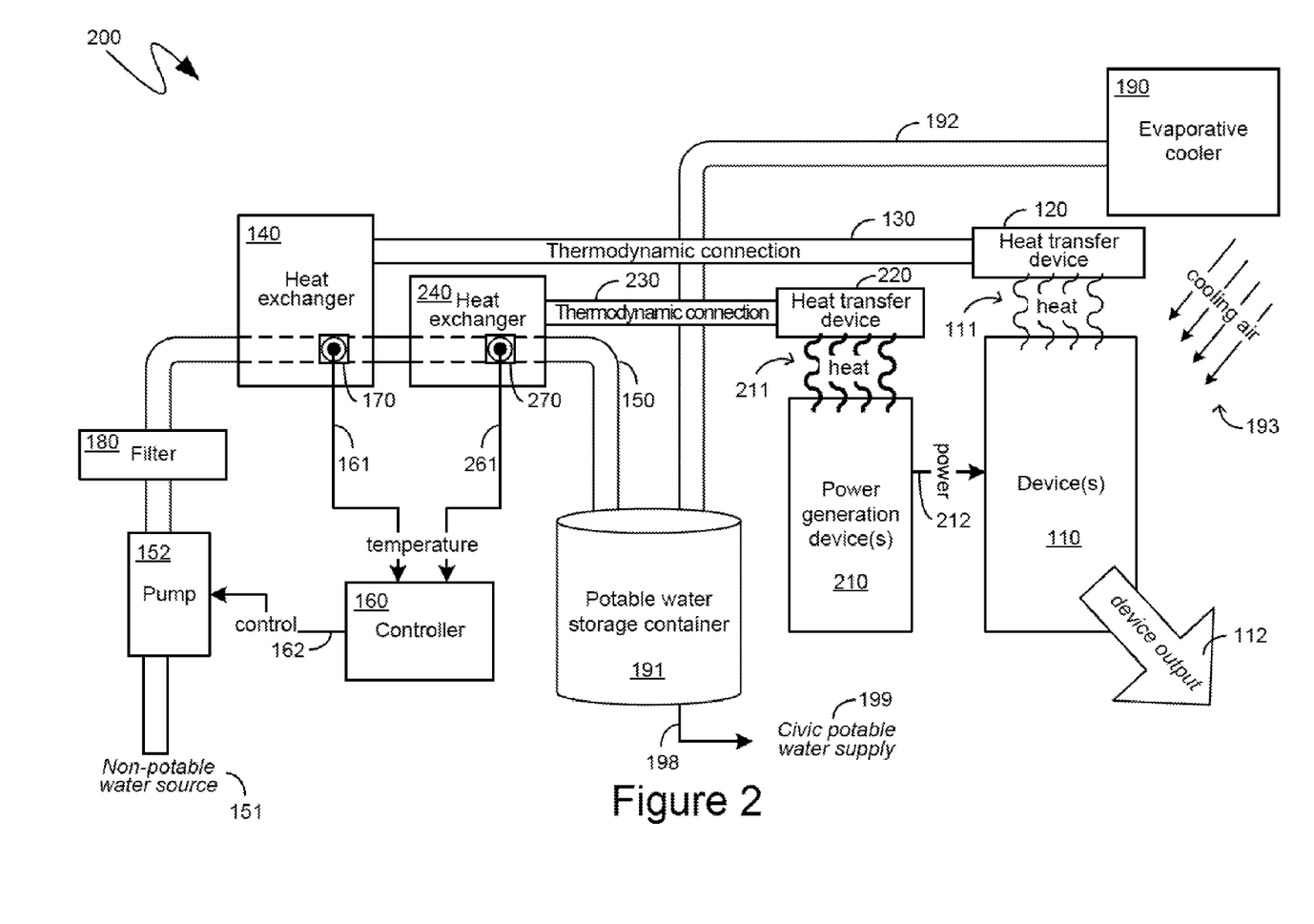
FIG. 2 is a block diagram of another exemplary generation of potable water from waste heat.

Turning to FIG. 2, the exemplary system 200 shown therein illustrates an exemplary system in which multiple devices can generate waste heat. More specifically, exemplary system 200 of FIG. 2 comprises both devices 110, such as those detailed above, and power generation devices 210. For ease of reference, equivalent components to those illustrated in FIG. 1 retain the same reference numerals in the exemplary system 200 of FIG. 2.

In the exemplary system 200 of FIG. 2, the devices 110 can generate device output 112 and, as a consequence, generate waste heat 111. Additionally, power generation devices 210 can generate power 212 that can be consumed by the devices 110 in generating the device output 112. The generation of the power 212, by the power generation devices 210, can also generate waste heat, namely the waste heat 211. According to one aspect, the waste heat 211 can be greater in quantity, temperature, or combinations thereof than the waste heat 111. In such an aspect, multiple heat exchangers can be utilized to increase the overall efficiency of the system. For example, the heat transfer device 120, absorbing the waste heat 111, from the devices 110, can still comprise a thermodynamic connection 130 to heat exchanger 140 such as in the manner described in detail above. However, the heating provided by such components may not be sufficient to heat the non-potable water in the piping 150 so as to neutralize biological contaminants. For example, if the devices 110 are server computing devices, then, as detailed above, the waste heat 111 being generated by such server computing devices can be of a temperature below that to which the non-potable water would need to be heated in order to kill any pathogens within it and transform it into potable water.

Consequently, according to one aspect, such as that illustrated by the exemplary system 200 of FIG. 2, another heat transfer device 220 can transfer the waste heat 211, from the power generation devices 210, to another heat exchanger, namely the exemplary heat exchanger 240, through which the piping 150 can also pass. As detailed above, the heat transfer device 220 can be a cold plate, a heatsink, or other like device that can transfer heat from the power generation devices 210 to the heat exchanger 240 via the thermodynamic connection 230, including the transfer of heat utilizing conductive or convective means, or combinations thereof. The thermodynamic connection 230 can then, like the thermodynamic connection 130, comprise a portion of metal, piping through which a liquid flows, or other like thermodynamic connection facilitating the transfer of heat from the heat transfer device 220 to the heat exchanger 240, again utilizing conductive or convective means, or combinations thereof. The heat exchanger 240 can then heat the water in the piping 150 running through it in the same manner as the heat exchanger 140 that was described in detail above. More specifically, the mechanisms described in detail above with reference the heat exchanger 140 are equally applicable to the heat exchanger 240. However, the heat exchanger 240 need not utilize identical mechanisms to those utilized by the heat exchanger 140. Instead, each heat exchanger can independently be designed to utilize those mechanisms best suited to the transfer of heat to the non-potable water, given the quantities and intensities of heat with which each such heat exchanger is expected to operate.

A temperature sensor 270 can monitor the temperature of the water in the piping 150 in the heat exchanger 240, in a manner analogous to that utilized by the temperature sensor 170, described in detail above. Temperature data 261, from the temperature sensor 270, can then inform the operation of the controller 160, in the same manner as the temperature data 161 that was described in detail above. For example, the controller 160 can issue control commands 162, to the pump 152, requesting that the pump 152 pump non-potable water into the heat exchanger 140. The controller 160 can then wait for the temperature data 161, from the temperature sensor 170, to indicate that the water has reached a certain temperature, has absorbed a certain quantity of heat, or has otherwise taken advantage of the waste heat 111 from the devices 110. For example, if the devices 110 are server computing devices, then it may be unrealistic to expect that the heat exchanger 140 will be able to heat water to a temperature much greater than forty or fifty degrees Celsius. Consequently, in such an example, once the controller 160 receives temperature data 161, from the temperature sensor 170, indicating that the water in that portion of the piping 150 that is in the heat exchanger 140 has reached temperature of, for example, forty degrees Celsius, the controller can issue the control commands 162, to the pump 152, requesting that the pump 152 pump new non-potable water into the heat exchanger 140 and, thereby, push the water heated to, for example, forty degrees Celsius, into the heat exchanger 240. The controller 160 can then monitor the temperature data 261, from the temperature sensor 240, to ascertain when the water in that portion of the piping 150 that is in the heat exchanger 240 has reached a predetermined temperature for a predetermined period of time in order to transform such water into potable water, such as in the manner described in detail above. One such a threshold is reached, the controller 160 can issue control commands 162 to the pump 152, thereby requesting the pump 152 to pump additional potable water through the piping 150.

The heating of the water, in the heat exchanger 140, results in hotter water being provided as input to the heat exchanger 240. Consequently, because the water is already at a higher temperature, due to the heat exchanger 140, the heat exchanger 240 can more efficiently raise the temperature of the water within it to the temperatures necessary to transform such water into potable water. As can be seen, therefore, the heat exchanger 140, by preheating the water, can make use of waste heat 111, which would otherwise not be sufficient by itself to transform non-potable water into potable water, to render the overall water purification process of the system 200 of FIG. 2 more efficient.

If the heat exchanger 240 transfers heat to the water at a rate at which the water within the heat exchanger 240 becomes transformed into potable water before the water in the heat exchanger 140 has reached the threshold temperature level, then the temperature data 161, from the temperature sensor 170 in the heat exchanger 140 can be a limiting factor in determining when the controller 160 triggers the pump 152, such as via the control commands 162. Conversely, if the heat exchanger 240 transfers heat to the water at a rate at which the water within the heat exchanger 240 does not transform into the potable water until after the water within the heat exchanger 140 has already reached the threshold temperature, then the temperature data 261, from the temperature sensor 270, can be a limiting factor in determining when the controller 160 triggers the pump 152 to supply additional non-potable water to the heat exchangers 140 and 240.

Figure 3:
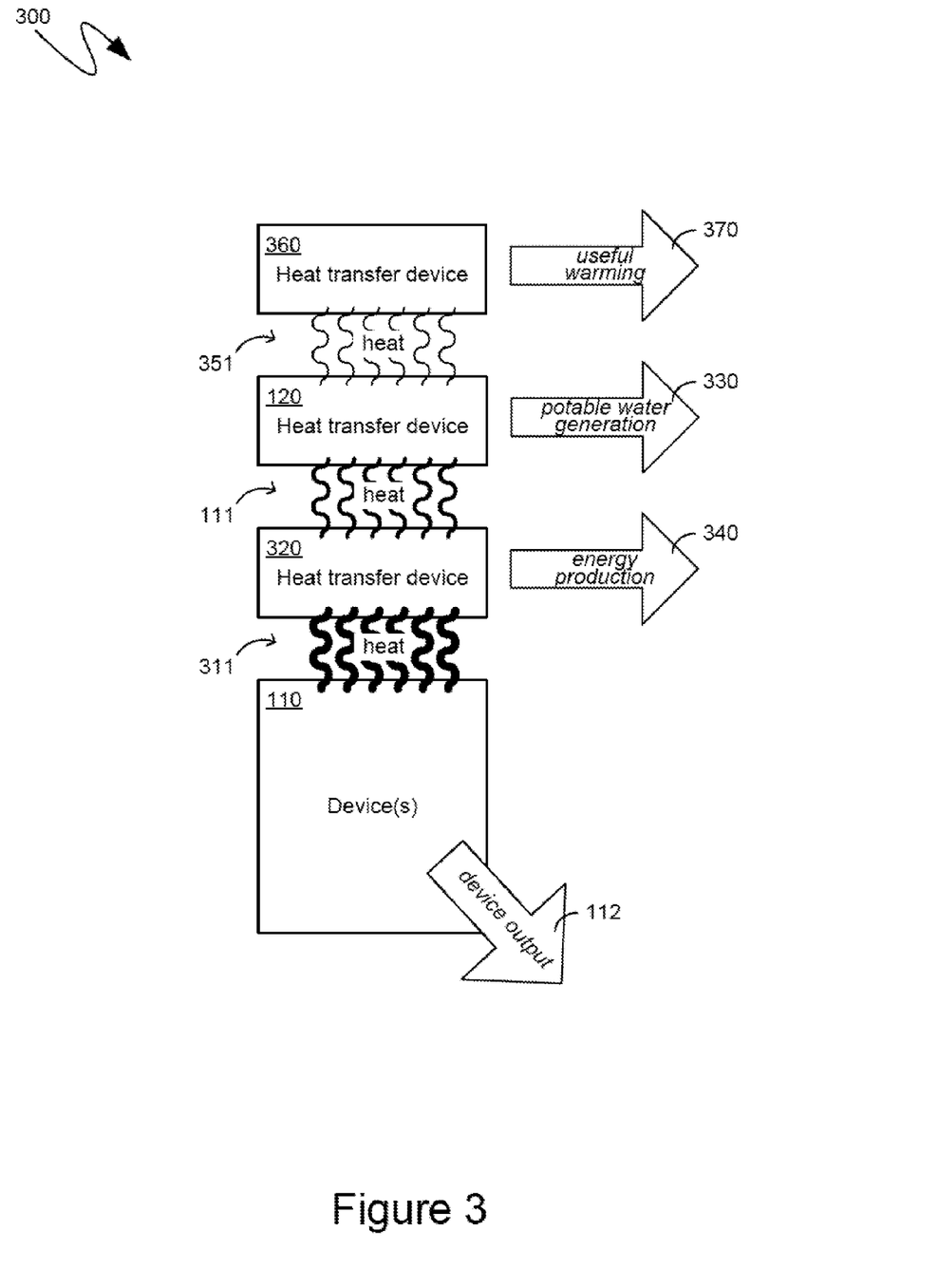
FIG. 3 is a block diagram of an exemplary utilization of waste heat for potable water generation in addition to other heat-driven processes.

Turning to FIG. 3, the exemplary system 300 shown therein illustrates exemplary mechanisms by which waste heat can be utilized for multiple independent purposes. More specifically, the heat transfer device 120 can be one of multiple heat transfer devices, or can operate in a sequential fashion with respect to the waste heat being generated by the devices 110. By way of illustration, the devices 110 can initially generate waste heat 311. Such waste heat can initially be utilized for one purpose such as, for example, energy production 340. More specifically, the waste heat 311 can, for example, boil water, and the steam generated thereby can turn a steam-powered turbine, or other like device, to generate electrical energy. The capture of the waste heat 311 for energy production purposes 340 can be facilitated by heat transfer device 320, such as in the manner described in detail above with respect to the heat transfer devices 120 and 220 of FIGS. 1 and 2.

According to one aspect, the heat transfer device 320 may not capture all of the waste heat 311 being sourced by the devices 110 and such heat can then be utilized for other purposes. For example, the previously described and illustrated waste heat 111 that was captured by the heat transfer device 120 and utilized for potable water generation 330 can be only a portion of the waste heat 311 that is generated as a byproduct of the operation of the devices 110. More specifically, the waste heat 111 can be the leftover portion of the waste heat 311 that was not utilized for another purpose, such as, for example, the energy production 340. Consequently, the waste heat 111, which was illustrated previously and referenced above, need not be directly sourced from the devices 110.

In an analogous manner, other heat transfer devices can facilitate the utilization of waste heat 351, which can comprise that portion of the waste heat 311, originally generated by the devices 110, that has not been utilized for other purposes, such as the exemplary energy production 340 and potable water generation 330. For example, the exemplary system 300 of FIG. 3 illustrates an exemplary heat transfer device 360 that can absorb the heat 351 that is left over from the original waste heat 311, after such waste heat was utilized, for example, for both the energy production 340 and the potable water generation 330. Heat transfer device 360 can utilize such heat 351 for still further purposes such as, for example, useful warming purposes 370. For example, such useful warming purposes 370 can include the warming of gas lines, mechanical devices, and other like componentry that can require warmer than ambient temperature for optimal operation, or which can be associated with endothermic processes that require the application of external heat to, for example, prevent freezing.

Figure 4:
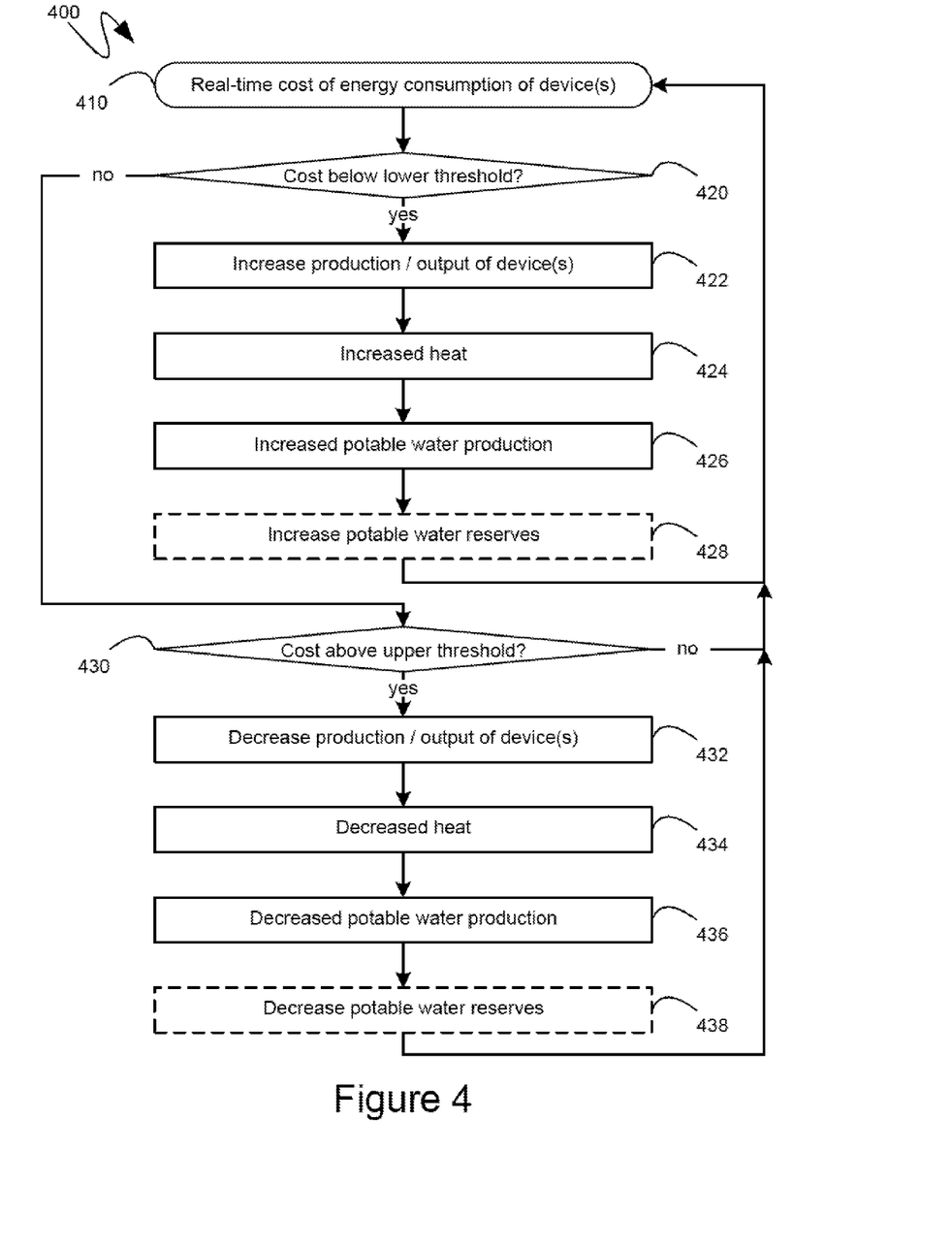
FIG. 4 is a flow diagram of an exemplary energy-price-driven potable water generation from waste heat.

Turning to FIG. 4, the exemplary flow diagram 400 shown therein illustrates an exemplary series of steps by which real-time energy costs can be taken into account, and the operation of the potable water generating systems described in detail above can be increased or decreased accordingly. More specifically, as illustrated in FIG. 4, at an initial step of 410, a real-time cost of the energy consumed by the devices generating the waste heat for the above-described water processing can be obtained. Such a real-time cost can be in the form of the cost of electrical energy being utilized by the devices. Such a real-time cost can also be in the form of raw material costs being utilized by electrical generation components, which can themselves generate waste heat, and which can also generate electrical power for use by other devices, which also generate waste heat.

The real-time cost of the energy consumption of the devices, obtained at step 410, can be compared to a threshold at step 420. If the cost is below such a threshold, then it can be advantageous to increase the production or output of the devices, at step 422. The threshold can be any price below which it can be economically justifiable, and, indeed, economically desirable, to consume additional energy to generate additional output from the devices and, as a consequence, generate additional heat that can result in the generation of additional potable water. The increase of the production or output of the devices, at step 422, can, as indicated, result in increased heat being generated by such devices, which is illustrated in FIG. 4 at step 424. Furthermore, increased waste heat can result in increased potable water production, at step 426, since the increased waste heat will raise the temperature of the non-potable water more quickly and, thereby, more quickly transform such non-potable water into potable water, increasing the throughput of the water purification system described in detail above. At step 428, the potable water reserves can be increased with the increased potable water production of step 426. Optionally, however, rather than increasing potable water reserves, increased potable water production can be directed elsewhere such as, for example, providing potable water to a municipal potable water supply. Consequently, step 428 is illustrated in dashed lines in FIG. 4 to indicate that it is optional. Processing can then return to step 410.

If, however, at step 420, it was determined that the real-time cost of the energy consumption of the devices, obtained at step 410, is not below a threshold, then processing can proceed to step 430, where such real-time energy costs can be compared to another threshold. The threshold, of step 430, can be the same as the threshold of step 420, or it can be established independently. As with the threshold of step 420, the threshold of step 430 can be any energy cost above which it can be economically advisable to reduce the production or output of the waste-heat-generating devices. Thus, if, at step 430, it is determined that the real-time cost of the energy consumption, obtained at step 410, is above such a threshold, then it can be advantageous to decrease energy consumption. Consequently, at step 432, the production or output of the devices can be decreased, thereby decreasing their energy consumption. As a consequence of such a decreased production and output of the devices, at step 432, less waste heat can be generated, such as is illustrated in FIG. 4 by step 434. Decreased waste heat generation can result in decreased potable water production, at step 436, since such decreased waste heat, at step 434, can increase the amount of time required before the non-potable water being heated by such waste heat reaches a temperature at which it is transformed into the potable water. Consequently, should potable water be required for evaporative cooling, and should such requirements be greater than the, now decreased, potable water production, potable water reserves may be decreased at step 438. However, if evaporative cooling is not required, the potable water reserves may not necessarily decrease. Consequently, as with step 428, step 438 is illustrated in FIG. 4 utilizing dashed lines to show that it is optional. Processing can then return to step 410. In such a manner, the potable water generation, described in detail above, can be dynamically adjusted to accommodate fluctuations in energy or raw material costs. Such fluctuations, and, consequently, such adjustments, can occur over a period of minutes, hours, days, weeks or even months.

The descriptions above include, as a first example, a system for generating potable water, the system comprising: a heat exchanger comprising both piping through which water is pumped and a thermodynamic connection to at least one device generating waste heat as a byproduct of other output generated by the at least one device, the thermodynamic connection transferring the waste heat from the at least one device to the heat-exchanger; a temperature sensor sensing a temperature of the water in the heat exchanger; a pump pumping the water through the heat exchanger; and a controller communicationally coupled to the temperature sensor and receiving the temperature of the water from the temperature sensor, the controller configured to control the pump, based on the received temperature of the water from the temperature sensor, to pump the water through the heat-exchanger so that water in the heat exchanger is sufficiently heated by the waste heat to render the water potable.

A second example is the system of the first example, wherein the controller is configured to control the pump so that the water in the heat exchanger reaches boiling and is above a threshold temperature for greater than a threshold period of time, the threshold temperature and the threshold period of time being a minimum sufficient to kill microbes in the water to render the water potable.

A third example is the system of the first example, further comprising a potable water storage container; wherein the controller is configured to control the pump to pump the potable water from the heat exchanger into the potable water storage container, and to pump non-potable water into the heat exchanger once water in the heat exchanger has been sufficiently heated by the waste heat to render the water potable.

A fourth example is the system of the first example, wherein the at least one device is a fuel cell and the other output is electrical power.

A fifth example is the system of the first example, further comprising an evaporative cooler providing cooling air to the at least one device, the evaporative cooler utilizing the water that was rendered potable by being heated in the heat exchanger.

A sixth example is the system of the first example, further comprising a filter through which the water is pumped prior to being pumped through the heat exchanger.

A seventh example is the system of the first example, wherein the filter is a chemical filter.

An eighth example is the system of the first example, further comprising a heat transfer device coupled to the at least one device generating the waste heat, the heat transfer device absorbing the waste heat and utilizing the thermodynamic connection to transfer the absorbed waste heat to the heat exchanger.

A ninth example is the system of the eighth example, wherein the at least one device is a server computing device and wherein further the heat transfer device is a heatsink coupled to a processor of the server computing device.

A tenth example is the system of the first example, wherein the thermodynamic connection comprises a closed loop of piping with a liquid inside.

An eleventh example is the system of the first example, wherein the heat exchanger comprises two sets of interwound piping, a first set comprising the piping through which the water is pumped and a second set comprising the thermodynamic connection.

An twelfth example is the system of the first example, further comprising a second heat exchanger comprising both a second piping through which the water is pumped and a second thermodynamic connection to at least one other device also generating waste heat as a byproduct of other output generated by the at least one other device, the second thermodynamic connection transferring the waste heat from the at least one other device to the second heat-exchanger; wherein the second piping of the second heat exchanger is coupled to the piping of the heat exchanger.

A thirteenth example is the system of the twelfth example, wherein the second heat exchanger preheats the water prior to the water being heated in the heat exchanger sufficiently to render the water potable.

A fourteenth example is the system of the twelfth example, wherein the at least one other device is a server computing device and the at least one device is a fuel cell providing electrical power to the server computing device.

A fifteenth example is the system of the twelfth example, further comprising a second temperature sensor sensing a temperature of the water in the second heat exchanger, the second temperature sensor also communicationally coupled to the controller and providing the temperature of the water in the second heat exchanger to the controller; wherein the controller is configured to control the pump based on both the received temperature of the water in the heat exchanger from the temperature sensor and the received temperature of the water in the second heat exchanger from the second temperature sensor.

A sixteenth example is the system of the first example, wherein original waste heat originating from the at least one device is first used for another purpose and leftover waste heat, after the utilization of the original waste heat, is the waste heat that is transferred by the thermodynamic connection to the heat exchanger from the at least one device.

A seventeenth example is the system of the first example, wherein leftover waste heat from the at least one device, unused by the thermodynamic connection transferring the waste heat from the at least one device to the heat exchanger, is used for another purpose.

An eighteenth example is the system of the first example, wherein the at least one device is controlled to generate greater quantities of the other output during periods when operating costs of the at least one device are below a first threshold; and wherein further the at least one device is controlled to generate lesser quantities of the other output during periods when the operating costs of the at least one device are above a second threshold, the quantities of the other output affecting the waste heat generated by the at least one device, which further affects a quantity of water rendered potable by application of the waste heat.

A nineteenth example is a method of generating potable water, the method comprising the steps of: transferring waste heat from one or more devices to water, wherein the one or more devices generate the waste heat as a byproduct of other output that is generated by the one or more devices; and maintaining the transferring until the water is sufficiently heated by the waste heat to render the water potable.

And a twentieth example is a system comprising: one or more devices generating waste heat as a byproduct of other output generated by the one or more devices; a heat exchanger comprising both piping through which water is pumped and a thermodynamic connection to at least some of the one or more devices, the thermodynamic connection transferring the waste heat from the at least one device to the heat-exchanger so that water in the heat exchanger is sufficiently heated by the waste heat to render the water potable; and an evaporative cooler utilizing the water that was rendered potable by the heat exchanger to provide cooling air to the one or more devices.

As can be seen from the above descriptions, the generation of potable water from waste heat has been presented. Which, in view of the many possible variations of the subject matter described herein, we claim as our invention all such embodiments as may come within the scope of the following claims and equivalents thereto.

We claim:

1. A system comprising:
   piping;
   a first metal plate attached to a processing unit of a computing device;
   a second metal plate attached to an electrical power generation device;
   a first closed loop of piping attached to the first metal plate further connected to a first portion of and inter-wound piping in a first heat-exchanger;
   a second closed loop of piping attached to the second metal plate and further connected to a second portion of inter-wound piping in a second heat-exchanger, respectively, the second closed loop of piping differing from the first closed loop of piping;
   one or more temperature sensors sensing a temperature of water in the piping;
   a pump pumping the water through the piping;
   a controller communicationally coupled to the one or more temperature sensors and receiving the temperature of the water from the one or more temperature sensors, the controller programmed to control the pump, based on the received temperature of the water from the temperature sensor, to pump the water through the piping, past the first and second portions so that water in the piping, after passing through both the first and second portions is heated to a predetermined temperature for a predetermined amount of time to, thereby, render the water potable; and
   one or more gas lines positioned above at least one of the first or second metal plate so as to absorb heat from at least one of the processing unit or the electrical power generation device, that is radiated by the first or second metal plate.

2. The system of claim 1, wherein the controller is programmed to control the pump so that at least some of the water in the piping reaches boiling and is above the predetermined temperature for greater than the predetermined period of time prior to the at least some of the water being pumped out of the piping, the predetermined temperature and the predetermined period of time being a minimum sufficient to kill microbes in the water to render the water potable.

3. The system of claim 1, wherein the electrical power generation device is a fuel cell.

4. The system of claim 1, further comprising an evaporative cooler providing cooling air to the computing device or the electrical power generation device, the evaporative cooler utilizing the water after the water has been pumped through the first and second portions of the piping.

5. The system of claim 1, further comprising a filter through which the water is pumped prior to being pumped through the first or second heat exchangers.

6. The system of claim 5, wherein the filter is a chemical filter.

7. The system of claim 1, wherein at least one of the first or second metal plates are a heatsink.

8. The system of claim 1, wherein the controller is programmed to control the pump to: (1) pump at least some of the water in the piping into the first heat exchanger to preheat the at least some of the water and (2) pump the preheated water from the first heat exchanger into the second heat exchanger to further heat the preheated water.

9. The system of claim 1, wherein the electrical power generation devices comprises one or more fuel cells providing electrical power to the computing device.

10. The system of claim 1, wherein the gas line carries gas to the electrical power generation devices.

11. The system of claim 4, further comprising a potable water storage container receiving the water after it has been pumped through the first and second heat exchangers, wherein the evaporative cooler draws the water from the potable water storage container, the potable water storage container also comprising a connection to a civic potable water supply.

12. The system of claim 1, wherein at least one of the first or second metal plates are a coldplate.

13. The system of claim 1, wherein either the first portion of inter-wound piping includes at least some of the second portion of inter-wound piping or the second portion of inter-wound piping includes at least some of the first portion of inter-wound piping.

14. A system comprising:
   piping;
   a first metal plate attached to a processing unit of a computing device;
   a second metal plate attached to an electrical power generation device;
   a first metal bar attached to the first metal plate and a first portion of the piping;
   a second metal bar attached to the second metal plate and a second portion of the piping, the second metal bar differing from the first metal bar;
   one or more temperature sensors sensing a temperature of water in the piping;
   a pump pumping the water through the piping;
   a controller communicationally coupled to the one or more temperature sensors and receiving the temperature of the water from the one or more temperature sensors, the controller programmed to control the pump, based on the received temperature of the water from the temperature sensor, to pump the water through the piping, past the first and second portions so that water in the piping, after passing through both the first and second portions is heated to a predetermined temperature for a predetermined amount of time to, thereby, render the water potable; and one or more gas lines positioned above at least one of the first or second metal plate so as to absorb heat from at least one of the processing unit or the electrical power generation device, that is radiated by the first or second metal plate.

15. The system of claim 14, wherein at least one of:

the first metal bar is attached to the first portion of the piping by the first portion of the piping cycling back and forth through metal fins that are attached to the first metal bar; or the second metal bar is attached to the second portion of the piping by the second portion of the piping cycling back and forth through metal fins that are attached to the second metal bar.

16. The system of claim 14, wherein the first metal plate is either a first heatsink or a first cold plate; and wherein further the second metal plate is either a second heatsink or a second cold plate.

17. A system comprising:

piping;

a first metal bar attached to a first metal plate and a first portion of the piping;

a first closed loop of piping attached to a second metal plate and inter-wound with a second portion of the piping, the second portion of the piping differing from the first portion of the piping;

one or more temperature sensors sensing a temperature of water in the piping;

a pump pumping the water through the piping;

a controller communicationally coupled to the one or more temperature sensors and receiving the temperature of the water from the one or more temperature sensors, the controller programmed to control the pump, based on the received temperature of the water from the temperature sensor, to pump the water through the piping, past the first and second portions so that water in the piping, after passing through both the first and second portions is heated to a predetermined temperature for a predetermined amount of time to, thereby, render the water potable; and one or more gas lines positioned above at least one of the first or second metal plate so as to absorb heat from at least one of the processing unit or the electrical power generation device, that is radiated by the first or second metal plate;

wherein the first metal plate is either attached to a first processing unit or a first electrical power generation device; and wherein further the second metal plate is either attached to a second processing unit or a second electrical power generation device.

18. The system of claim 17, wherein the first metal bar is attached to the first portion of the piping by the first portion of the piping cycling back and forth through metal fins that are attached to the first metal bar.

19. The system of claim 17, wherein the first metal plate is either a first heatsink or a first cold plate; and wherein further the second metal plate is either a second heatsink or a second cold plate.

* * * * *